US008886412B2

(12) United States Patent
Rosol et al.

(10) Patent No.: US 8,886,412 B2

(45) Date of Patent: Nov. 11, 2014

(54) STEERING SYSTEM FOR AN AUTONOMOUSLY DRIVEN VEHICLE AND METHODS OF STEERING THE SAME

(71) Applicant: GM Global Technology Operations LLC, Detroit, MI (US)

(72) Inventors: Kenneth L. Rosol, Clinton Township, MI (US); David M. Sidlosky, Beverly Hills, MI (US); Robert W. Leschuk, Oxford, MI (US); Scott R. Kloess, Rochester Hills, MI (US); John T. Zuzelski, Clarkston, MI (US); Eric L. Raphael, Birmingham, MI (US); Yat-Chung Tang, Rochester, MI (US); Stephen Pastor, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/826,122

(22) Filed: Mar. 14, 2013

(65) Prior Publication Data

US 2014/0277893 A1 Sep. 18, 2014

(51) Int. Cl.

| | |
|---|---|
| ***B62D 5/04*** | (2006.01) |
| ***B62D 5/30*** | (2006.01) |
| ***B62D 6/00*** | (2006.01) |
| ***B60W 10/20*** | (2006.01) |
| ***B62D 5/00*** | (2006.01) |
| ***B62D 7/14*** | (2006.01) |

(52) U.S. Cl.

CPC ................ *B62D 6/00* (2013.01); *B60W 10/20* (2013.01); *B62D 5/003* (2013.01); *B62D 7/148* (2013.01); *B62D 5/30* (2013.01)

USPC ................ 701/43; 701/23; 701/41; 180/402; 180/445

(58) Field of Classification Search

CPC ........ B62D 6/00; B62D 5/003; B62D 5/0409; B62D 5/0421; B62D 5/30; B62D 9/00; B62D 7/148; B60W 10/20

See application file for complete search history.

(56) References Cited

U.S. PATENT DOCUMENTS 4,934,474 A * 6/1990 Sugasawa ..................... 180/414
5,332,260 A 7/1994 Heinrichs et al.

(Continued)

FOREIGN PATENT DOCUMENTS

GB 2322608 A 9/1998
JP 10-24858 * 1/1998

OTHER PUBLICATIONS

"Steer-by-wire within a year!" article from the Vehicle Dynamics International website; http://www.vehicledynamicsinternational.com/news.php?NewsID=43726; accessed on Oct. 25, 2012; 2 pages.

(Continued)

*Primary Examiner* — Michael J Zanelli

(74) *Attorney, Agent, or Firm* — Quinn Law Group, PLLC

(57) ABSTRACT

A steering system for an autonomously driven vehicle and methods of steering the vehicle are disclosed. A main controller signals a secondary steering assembly to operate in a first phase when a power steering controller is in a first mode and a second phase to steer the vehicle when the power steering controller is in a second mode. The main controller signals a friction device to actuate to a disengaged position when the power steering controller is in the first mode and the secondary steering assembly is in the first phase, and to signal the friction device to actuate to an engaged position to secure a steering wheel in an initial position when the power steering controller is in the second mode and the secondary steering assembly is in the second phase to allow the secondary steering assembly to steer the vehicle.

20 Claims, 3 Drawing Sheets

(56) References Cited

U.S. PATENT DOCUMENTS

| | | | | |
|---|---|---|---|---|
| 6,050,359 | A | 4/2000 | Mouri et al. | |
| 8,442,699 | B2 | 5/2013 | Takamatsu et al. | |
| 2005/0045413 | A1 * | 3/2005 | Shitamitsu et al. | 180/402 |
| 2005/0178606 | A1 * | 8/2005 | Husain et al. | 180/408 |
| 2008/0289897 | A1 * | 11/2008 | Williams | 180/402 |
| 2013/0253793 | A1 | 9/2013 | Lee et al. | |

OTHER PUBLICATIONS

U.S. Appl. No. 13/750,408 entitled Steering System for an Autonomously Driven Vehicle and Methods of Steering the Same; filed on Jan. 25, 2013; 29 pages.

* cited by examiner

STEERING SYSTEM FOR AN AUTONOMOUSLY DRIVEN VEHICLE AND METHODS OF STEERING THE SAME

TECHNICAL FIELD

The present disclosure relates to a steering system for an autonomously driven vehicle and methods of steering the autonomously driven vehicle.

BACKGROUND

Autonomously driven vehicles are being developed to navigate the vehicle without a human driver steering the vehicle. Various components, such as visual sensors, are being developed to guide the autonomously driven vehicle along the roads, identify surrounding vehicles and maintain the vehicle within its lane.

SUMMARY

The present disclosure provides a steering system for an autonomously driven vehicle. The steering system includes a primary steering assembly, with the primary steering assembly including a rotatable steering wheel. The steering system also includes a power steering controller in communication with the primary steering assembly and having a first mode and a second mode. The steering system further includes a main controller in communication with the power steering controller. The steering system also includes a secondary steering assembly in communication with the main controller such that the main controller signals the secondary steering assembly to operate in a first phase when the power steering controller is in the first mode and a second phase to steer the vehicle when the power steering controller is in the second mode. Furthermore, the steering system includes a friction device coupled to the primary steering assembly. The friction device is movable between a disengaged position releasing the primary steering assembly to allow rotation of the steering wheel and an engaged position engaging the primary steering assembly to secure the steering wheel in an initial position. The main controller is in communication with the friction device to signal the friction device to actuate to the disengaged position when the power steering controller is in the first mode and the secondary steering assembly is in the first phase, and to signal the friction device to actuate to the engaged position to secure the steering wheel in the initial position when the power steering controller is in the second mode and the secondary steering assembly is in the second phase to allow the secondary steering assembly to steer the vehicle.

The present disclosure also provides a method of steering an autonomously driven vehicle. The method includes determining that a power steering controller is in one of a first mode and a second mode different from the first mode. A main controller is signaled that the power steering controller is in the first mode. A secondary steering assembly is signaled, via the main controller, to operate in a first phase in response to the power steering controller being in the first mode such that a primary steering assembly steers the vehicle. A friction device is signaled, via the main controller, to operate in a disengaged position in response to the power steering controller being in the first mode such that a steering wheel of the primary steering assembly is rotatable. The main controller is signaled that the power steering controller is in the second mode. The secondary steering assembly is signaled, via the main controller, to switch from the first phase to operate in a second phase in response to the power steering controller being in the second mode such that the secondary steering assembly steers the vehicle. The friction device is actuated from the disengaged position to the engaged position in response to the power steering controller being in the second mode. The primary steering assembly is engaged with the friction device when the friction device is in the engaged position to secure the steering wheel in an initial position such that the secondary steering assembly steers the vehicle when in the second phase.

The present disclosure provides another method of steering an autonomously driven vehicle. A secondary steering assembly is operated in a second phase to steer the vehicle when an interruption occurs in a primary steering assembly of the vehicle. The primary steering assembly is engaged with a friction device to secure a steering wheel in an initial position when the secondary steering assembly is in the second phase to steer the vehicle.

Accordingly, this steering system provides a back-up system for the primary steering assembly of the autonomously driven vehicle which allows the secondary steering assembly to steer the vehicle in certain situations, such as, when the interruption occurs in the primary steering assembly. For example, the secondary steering assembly will turn the rear wheels of the vehicle to steer the vehicle while the friction device secures the steering wheel in the initial position such that the front wheels do not turn.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
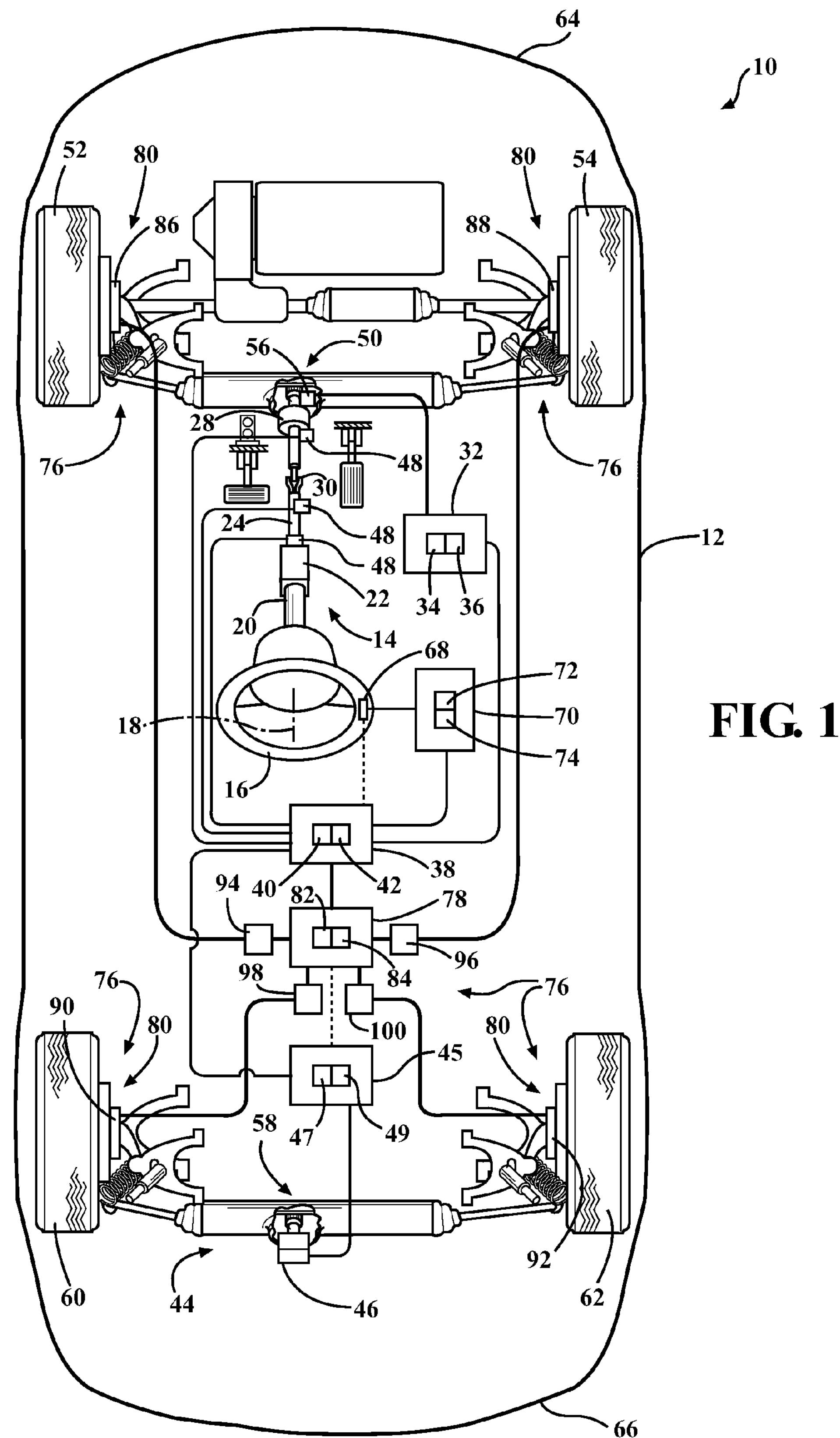
FIG. 1 is a schematic top view diagram of a steering system for an autonomously driven vehicle.
Figure 3:
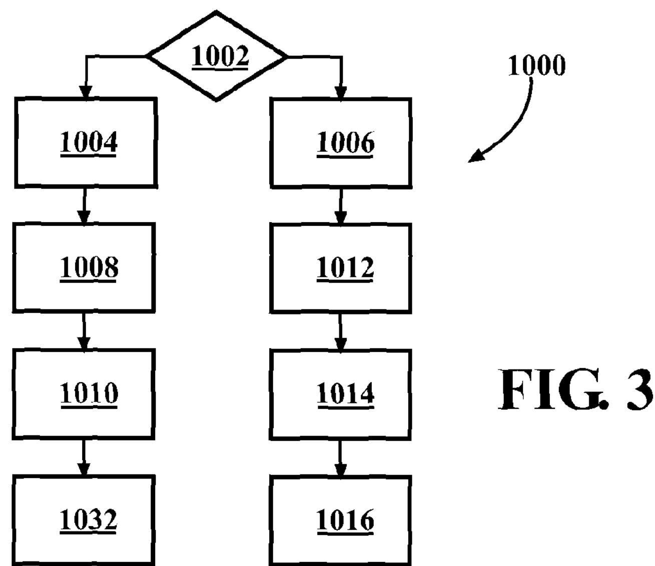
FIG. 3 is a schematic flowchart of a method of steering the vehicle of FIGS. 1 and 2.
Figure 4:
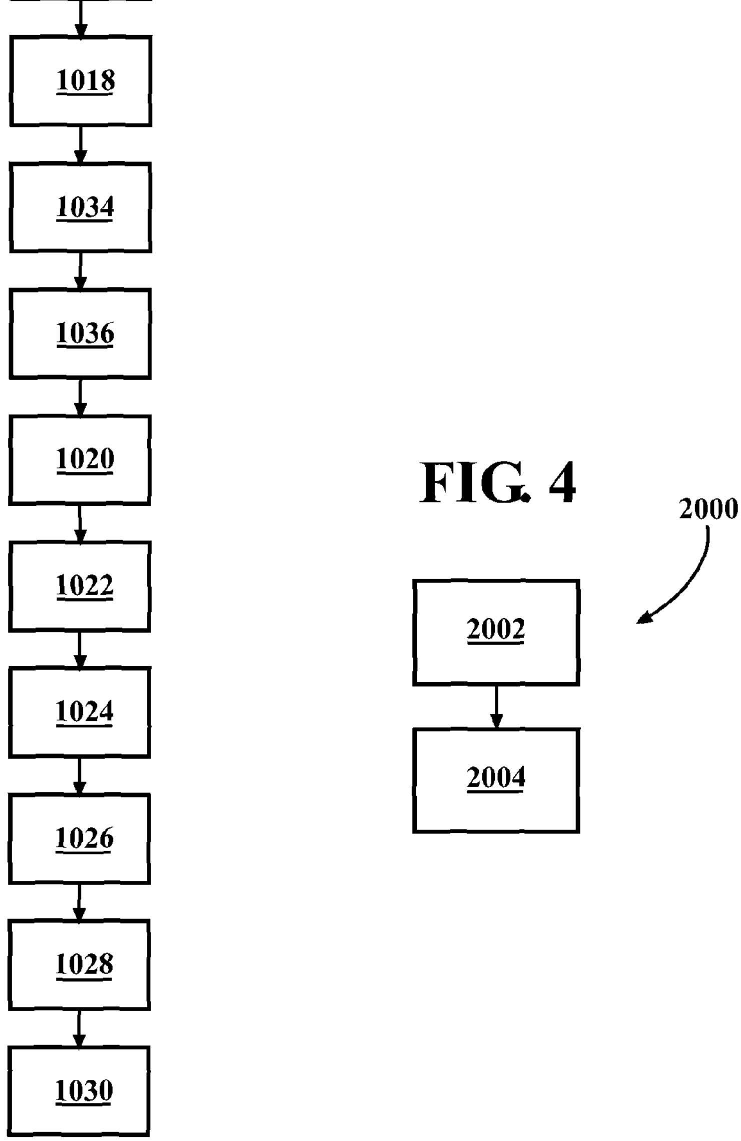
FIG. 4 is a schematic flowchart of another method of steering the vehicle of FIGS. 1 and 2.

Referring to the Figures, wherein like numerals indicate like or corresponding parts throughout the several views, a steering system 10 for an autonomously driven vehicle 12 is shown in FIG. 1. Furthermore, as shown in FIGS. 3 and 4, the present disclosure also provides methods 1000, 2000 of steering the autonomously driven vehicle 12, which will be discussed in detail below. Specifically, the steering system 10 and the methods 1000, 2000 of steering the vehicle 12 disclosed herein provide a back-up system for the primary steering of the vehicle 12 in certain situations. For example, this back-up system can be activated when an interruption occurs in the primary steering of the vehicle 12 as discussed further below.

Generally, the autonomously driven vehicle 12 can move and stop along a road, a street, etc. without being controlled or steered by a person or human in a driver's seat. In other words, a destination can be inputted or programmed into a computer of the autonomously driven vehicle 12 and the vehicle 12 will drive itself along the road(s), etc. and arrive at the desired location without a human driver manually steering the vehicle 12. It is to be appreciated various sensors, controllers, etc. can be utilized to maintain the autonomously driven vehicle 12 in a desired lane on the road.

Figure 2:
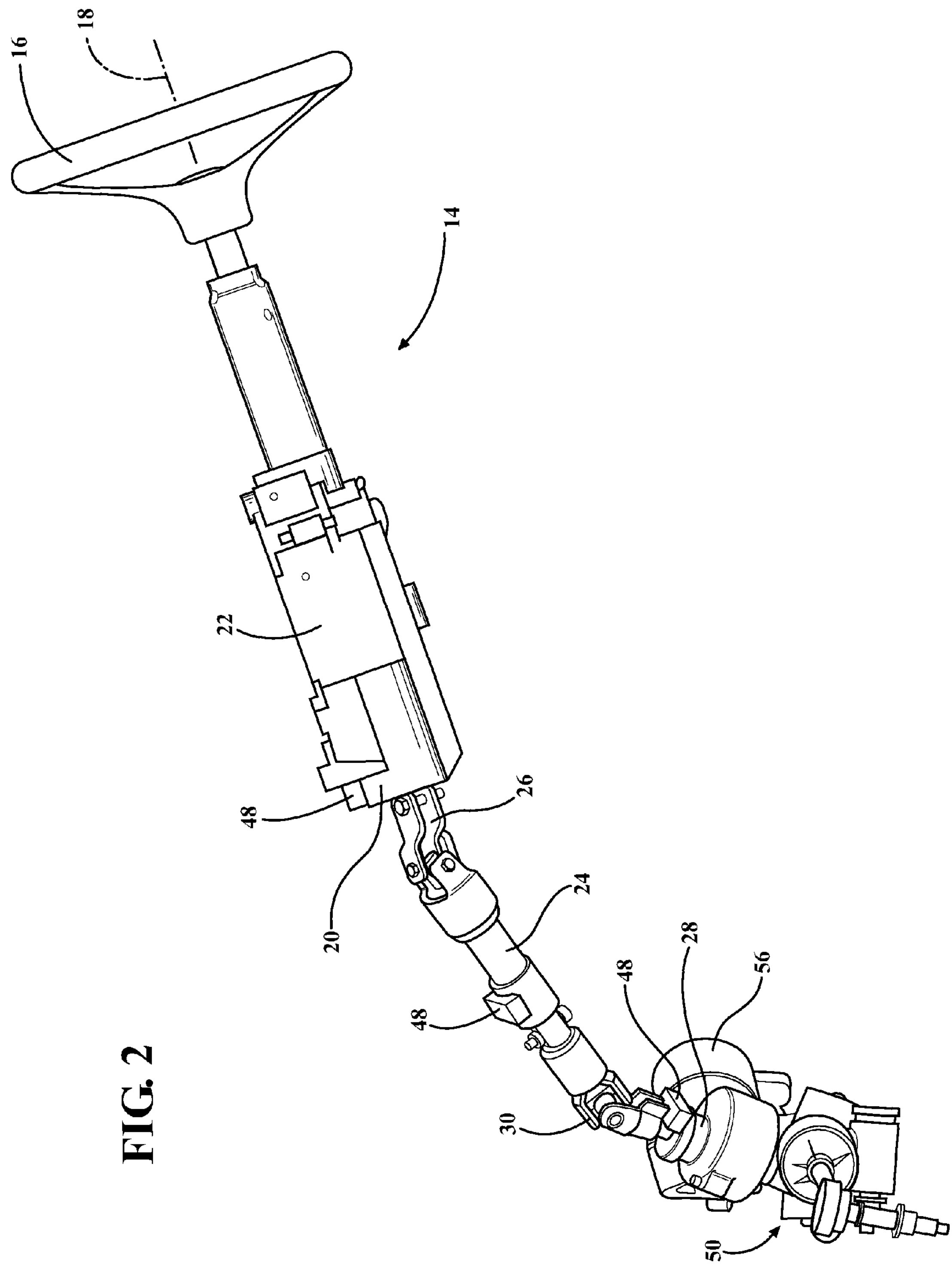
FIG. 2 is a schematic perspective view of a primary steering assembly.

Referring to FIGS. 1 and 2, the steering system 10 includes a primary steering assembly 14. The primary steering assembly 14 steers or directs the vehicle 12 along the road(s), etc. to a desired location. The primary steering assembly 14 can include numerous components and some of these components are discussed below. For example, the primary steering assembly 14 includes a rotatable steering wheel 16. As such, the steering wheel 16 can be rotatable about a longitudinal axis 18. Traditionally, the steering wheel 16 is utilized by the driver to steer a non-autonomously driven vehicle. In certain situations, as discussed below, the steering wheel 16 of the autonomously driven vehicle 12 discussed herein can be engaged to manually steer the vehicle 12. For example, the steering wheel 16 can be touched or grasped by the driver to manually steer the vehicle 12 in certain situations, such as when the primary steering of the vehicle 12 is interrupted, as discussed below.

Turning to FIG. 2, the primary steering assembly 14 can include a rotatable steering column 20. As such, the steering column 20 can be rotatable about the longitudinal axis 18. Generally, the steering wheel 16 is attached to the steering column 20 such that the steering wheel 16 and the steering column 20 commonly rotate. Therefore, rotation of one of the steering wheel 16 and the steering column 20 causes rotation of the other one of the steering wheel 16 and the steering column 20. In other words, the steering wheel 16 and the steering column 20 rotate in unison. Optionally, the steering column 20 can be a tilting and/or telescoping steering column 20. As such, the steering column 20 can tilt, for example up and down, relative to the driver's seat to position the steering wheel 16 in a desired location. Furthermore, the steering column 20 can telescope, for example back and forth, relative to the driver's seat to position the steering wheel 16 in a desired location.

Generally, the steering column 20 can include a bracket 22 coupled to the vehicle 12 to support the steering column 20. In other words, the bracket 22 is attached or mounted to the vehicle 12 and supports the steering column 20 such that the steering column 20 can rotate independently of the bracket 22. For example, in certain embodiments, the steering column 20 can tilt and/or telescope relative to the bracket 22. It is to be appreciated that the steering column 20 can include other components not specifically discussed herein.

Continuing with FIG. 2, the primary steering assembly 14 can include an intermediate shaft 24 operatively coupled to the steering column 20 such that the intermediate shaft 24 and the steering column 20 commonly rotate. In other words, the steering column 20 and the intermediate shaft 24 rotate in unison. Therefore, the steering wheel 16, the steering column 20 and the intermediate shaft 24 rotate in unison. It is to be appreciated that the intermediate shaft 24 can be operatively coupled to the steering column 20 by a universal joint 26 or any other suitable component(s).

In addition, continuing with FIG. 2, the primary steering assembly 14 can include a steering gear mechanism 28 operatively coupled to the intermediate shaft 24, with the intermediate shaft 24 disposed between the steering gear mechanism 28 and the steering column 20. The intermediate shaft 24 can be operatively coupled to the steering gear mechanism 28 by a universal joint 30 or any other suitable component(s). Therefore, for example, distal ends of the intermediate shaft 24 have the universal joints 26, 30. The steering gear mechanism 28 will be discussed further below.

Turning to FIG. 1, the steering system 10 also includes a power steering controller 32 in communication with the primary steering assembly 14 and having a first mode and a second mode. Therefore, the power steering controller 32 is coupled to the primary steering assembly 14 and monitors the primary steering assembly 14. Generally, the first and second modes are different from each other. For example, the first mode can be when the primary steering assembly 14 is functioning in a first operating condition and the second mode can be when the primary steering assembly 14 is functioning in a second operating condition. The first operating condition can be when the vehicle 12 is being operated without the steering wheel 16 being engaged by the driver. The second operating condition can be when the vehicle 12 is to be steered by the driver, such as, for example, when there has been the interruption in the primary steering of the vehicle 12, such as an interruption in the primary steering assembly 14. The first and second operating conditions are discussed further below. Optionally, the power steering controller 32 can be disposed in a power steering module which is coupled to the primary steering assembly 14. The power steering module can house other steering components, such as sensors, etc., or components not specifically discussed herein.

The power steering controller 32, shown schematically in FIG. 1, can be embodied as a digital computer device or multiple such devices in communication with the various components of the vehicle 12. Structurally, the power steering controller 32 can include at least one microprocessor 34 along with sufficient tangible, non-transitory memory 36, e.g., read-only memory (ROM), flash memory, optical memory, additional magnetic memory, etc. The power steering controller 32 can also include any required random access memory (RAM), electrically-programmable read only memory (EPROM), a high-speed clock, analog-to-digital (A/D) and/or digital-to-analog (D/A) circuitry, and any input/output circuitry or devices, as well as any appropriate signal conditioning and buffer circuitry. Instructions for executing the methods 1000, 2000 for steering the vehicle 12 are recorded in the memory 36 and executed as needed via the microprocessor(s) 34.

The steering system 10 further includes a main controller 38 in communication with the power steering controller 32. The main controller 38, shown schematically in FIG. 1, can be embodied as a digital computer device or multiple such devices in communication with the various components of the vehicle 12. Structurally, the main controller 38 can include at least one microprocessor 40 along with sufficient tangible, non-transitory memory 42, e.g., read-only memory (ROM), flash memory, optical memory, additional magnetic memory, etc. The main controller 38 can also include any required random access memory (RAM), electrically-programmable read only memory (EPROM), a high-speed clock, analog-to-digital (A/D) and/or digital-to-analog (D/A) circuitry, and any input/output circuitry or devices, as well as any appropriate signal conditioning and buffer circuitry. Instructions for executing the methods 1000, 2000 for steering the vehicle 12 are recorded in the memory 42 and executed as needed via the microprocessor(s) 40. Optionally, the main controller 38 can be disposed in a controller module and other components, such as sensors, etc., or components not specifically discussed herein, can be disposed in the controller module.

In addition, the steering system 10 includes a secondary steering assembly 44 in communication with the main controller 38 such that the main controller 38 signals the secondary steering assembly 44 to operate in a first phase when the power steering controller 32 is in the first mode and a second phase to steer the vehicle 12 when the power steering controller 32 is in the second mode. For example, when the secondary steering assembly 44 is in the first phase and the power steering controller 32 is in the first mode, the secondary steering assembly 44 can be activated or actuated to assist the primary steering assembly 14 in steering the vehicle 12 or the secondary steering assembly 44 can be deactivated or inactive such that the secondary steering assembly 44 does not assist the primary steering assembly 14 in steering the vehicle 12 when the primary steering assembly 14 is functioning in the first operating condition such that the vehicle 12 is being steered without the steering wheel 16 being engaged by the driver. Therefore, when the secondary steering assembly 44 is operating in the first phase and the power steering controller 32 is in the first mode, the primary steering assembly 14 is steering the vehicle 12 without the driver touching the steering wheel 16.

In certain embodiments, the steering system 10 can include a rear steering controller 45 in communication with the secondary steering assembly 44 and the main controller 38. Generally, the secondary steering assembly 44 is in communication with the main controller 38 through the rear steering controller 45. Signals can be routed through the rear steering controller 45 to the secondary steering assembly 44. The rear steering controller 45, shown schematically in FIG. 1, can be embodied as a digital computer device or multiple such devices in communication with the various components of the vehicle 12. Structurally, the rear steering controller 45 can include at least one microprocessor 47 along with sufficient tangible, non-transitory memory 49, e.g., read-only memory (ROM), flash memory, optical memory, additional magnetic memory, etc. The rear steering controller 45 can also include any required random access memory (RAM), electrically-programmable read only memory (EPROM), a high-speed clock, analog-to-digital (A/D) and/or digital-to-analog (D/A) circuitry, and any input/output circuitry or devices, as well as any appropriate signal conditioning and buffer circuitry. Instructions for executing the methods 1000, 2000 for steering the vehicle 12 are recorded in the memory 49 and executed as needed via the microprocessor(s) 47. Optionally, the rear steering controller 45 can be disposed in a controller module and other components, such as sensors, etc., or components not specifically discussed herein, can be disposed in the controller module.

The main controller 38 signals the secondary steering assembly 44 to be in the first phase when the power steering controller 32 is in the first mode and signals the secondary steering assembly 44 to be in the second phase to steer the vehicle 12 when the power steering controller 32 is in the second mode. Therefore, when the primary steering assembly 14 is steering the vehicle 12 (in the first operating condition), the secondary steering assembly 44 can be deactivated or can be activated to assist the primary steering assembly 14 in steering the vehicle 12. In other words, the primary steering assembly 14 primarily steers the vehicle 14 when there is no interruption in the primary steering assembly 14 and the secondary steering assembly 44 can optionally assist the primary steering assembly 14 in this condition. As such, when the primary steering assembly 14 is interrupted (in the second operating condition), the secondary steering assembly 44 takes over steering the vehicle 12 and the primary steering assembly 14 does not steer the vehicle 12. Therefore, when the primary steering assembly 14 is functioning in the second operating condition, the secondary steering assembly 44 will steer the vehicle 12 until the driver engages the steering wheel 16.

The secondary steering assembly 44 can include an actuator 46 in communication with the main controller 38. More specifically, the rear steering controller 45 communicates with the actuator 46. Therefore, the actuator 46 is in communication with the main controller 38 through the rear steering controller 45. As such, the actuator 46 is in communication with the rear steering controller 45 such that the rear steering controller 45 signals the actuator 46 to operate in the first phase when the power steering controller 32 is in the first mode and operate in the second phase when the power steering controller 32 is in the second mode. The main controller 38 can signal the actuator 46 to be operating in the first phase when the power steering controller 32 is in the first mode such that the actuator 46 can optionally be actuated to assist the primary steering assembly 14 in steering the vehicle 12. Furthermore, the main controller 38 can signal the actuator 46 to be operating in the second phase when the power steering controller 32 is in the second mode such that the actuator 46 is actuated to steer the vehicle 12. Additionally, the main controller 38 can signal the actuator 46 to return to being operated in the first phase under certain conditions as discussed further below. The actuator 46 can be an electric motor, an electro-mechanical motor, a hydraulic device, a pneumatic device, or any other suitable actuator.

Referring to FIGS. 1 and 2, the steering system 10 also includes a friction device 48 coupled to the primary steering assembly 14. The friction device 48 is movable between a disengaged position releasing the primary steering assembly 14 to allow rotation of the steering wheel 16 and an engaged position engaging the primary steering assembly 14 to secure the steering wheel 16 in an initial position. The main controller 38 is in communication with the friction device 48 to signal the friction device 48 to actuate to the disengaged position when the power steering controller 32 is in the first mode and the secondary steering assembly 44 is in the first phase, and to signal the friction device 48 to actuate to the engaged position to secure the steering wheel 16 in the initial position when the power steering controller 32 is in the second mode and the secondary steering assembly 44 is in the second phase to allow the secondary steering assembly 44 to steer the vehicle 12. Therefore, when the friction device 48 is in the disengaged position, the steering wheel 16 can rotate about the longitudinal axis 18 freely or unrestricted. Furthermore, when the friction device 48 is in the engaged position, the steering wheel 16 is secured in the initial position such that the steering wheel 16 cannot be rotated freely, and therefore, rotation of the steering wheel 16 is restricted. It is to be appreciated that the amount of force or friction applied to the primary steering assembly 14 by the friction device 48 can be adjusted or varied as desired.

As shown in FIGS. 1 and 2, the friction device 48 can be coupled to the primary steering assembly 14 in various locations. For example, in one embodiment, the friction device 48 is coupled to the steering column 20 such that the friction device 48 engages the steering column 20 when in the engaged position to secure the steering wheel 16 in the initial position. As another example, in one embodiment, the friction device 48 is coupled to the intermediate shaft 24 such that the friction device 48 engages the intermediate shaft 24 when in the engaged position to secure the steering wheel 16 in the initial position. As yet another example, in one embodiment, the friction device 48 is coupled to the steering gear mechanism 28 such that the friction device 48 engages the steering gear mechanism 28 when in the engaged position to secure the steering wheel 16 in the initial position. Generally, one friction device 48 is coupled to the primary steering assembly 14 in one of the above identified locations. It is to be appreciated that more than one friction devices 48 can be coupled to the primary steering assembly 14 in one or more of the above identified locations. Furthermore, the friction device 48 is shown schematically in FIGS. 1 and 2 for illustrative purposes only and can be any suitable configuration, such as for example, a clutch, a damper, a magnetic device, an electromagnetic device, friction plates, a brake apparatus, such as a caliper and rotor brake, belt-driven friction device, etc.

Continuing with FIG. 1, the primary steering assembly 14 can include a primary rack and pinion apparatus 50 operatively coupled to the steering gear mechanism 28 and extending outwardly to distal ends opposing each other. Generally, a first wheel 52 and a second wheel 54 are operatively coupled to respective distal ends of the primary rack and pinion apparatus 50. In other words, the first and second wheels 52, 54 are operatively coupled to the primary rack and pinion apparatus 50. Therefore, when the steering wheel 16 or the steering column 20 rotates, correspondingly, the primary rack and pinion apparatus 50 moves to pivot or turn the first and second wheels 52, 54 and move the vehicle 12 in the desired direction.

Furthermore, the steering gear mechanism 28 can include an electric motor 56 to assist in moving the primary rack and pinion apparatus 50 in response to rotation of the steering wheel 16 to pivot the first and second wheels 52, 54 and steer the vehicle 12 when the power steering controller 32 is in the first mode. Therefore, the electric motor 56 is operatively coupled to the steering gear mechanism 28 and thus the primary rack and pinion apparatus 50 to assist in rotating the steering wheel 16. As such, actuation of the steering gear mechanism 28 causes the electric motor 56 to be actuated to assist in moving the primary rack and pinion apparatus 50 and thus move the first and second wheels 52, 54 accordingly. Generally, the power steering controller 32 is in communication with the electric motor 56; and thus, the power steering controller 32 can signal to the electric motor 56 to selectively actuate. As such, the electric motor 56 acts as a power steering assist for the primary steering assembly 14.

The secondary steering assembly 44 can include a secondary rack and pinion apparatus 58 extending outwardly to distal ends opposing each other. Generally, a third wheel 60 and a fourth wheel 62 are operatively coupled to respective distal ends of the secondary rack and pinion apparatus 58. The actuator 46 is operatively coupled to the secondary rack and pinion apparatus 58 such that actuation of the actuator 46 moves the secondary rack and pinion apparatus 58 to pivot the third and fourth wheels 60, 62 to steer the vehicle 12 when the secondary steering assembly 44 is in the second phase and the power steering controller 32 is in the second mode. In other words, when the actuator 46 is actuated, the secondary rack and pinion apparatus 58 moves to pivot or turn the third and fourth wheels 60, 62 to steer the vehicle 12. Generally, the first and second wheels 52, 54 are disposed adjacent to a front 64 of the vehicle 12 and the third and fourth wheels 60, 62 are disposed adjacent to a rear 66 of the vehicle 12. For example, the primary steering assembly 14 can pivot the first and second wheels 52, 54 or the front wheels of the vehicle 12, and the secondary steering assembly 44 can pivot the third and fourth wheels 60, 62 or the rear wheels of the vehicle 12. Therefore, the primary steering assembly 14 functions to pivot the first and second wheels 52, 54 independently of the secondary steering assembly 44 pivoting the third and fourth wheels 60, 62. Similarly, the second steering assembly functions to pivot the third and fourth wheels 60, 62 independently of the primary steering assembly 14 pivoting the first and second wheels 52, 54. The actuator 46 can be coupled to the vehicle 12 in any suitable location to cooperate with the secondary rack and pinion apparatus 58. It is to be appreciated that any suitable secondary steering assembly 44 can be operatively coupled to the third and fourth wheels 60, 62 or the rear wheels, and utilizing the secondary rack and pinion apparatus 58 is one suitable example.

When the friction device 48 is in the engaged position such that the steering wheel 16 is secured in the initial position and when the actuator 46 is activated or actuated, the actuator 46 causes movement of the secondary rack and pinion apparatus 58 back and forth to steer the vehicle 12. Maintaining the steering wheel 16 in the initial position when the secondary steering assembly 44 is being operated in the second phase prevents or minimizes the steering wheel 16 from rotating due to torques urging the steering wheel 16 to self-align. Rotation of the steering wheel 16 can counteract the movement of the third and fourth wheels 60, 62 (the rear wheels) by the secondary rack and pinion apparatus 58 when the secondary steering assembly 44 is steering the vehicle 12 by allowing the front wheels to self-align; therefore, the steering wheel 16 is secured in the initial position to minimize such counteraction. As such, when the steering wheel 16 is secured in the initial position, this simulates the driver holding or grasping the steering wheel 16. Thus, the first and second wheels 52, 54 (the front wheels) remain in a certain position as the third and fourth wheels 60, 62 (the rear wheels) pivot or turn to steer the vehicle 12.

The power steering controller 32 can detect whether the primary steering assembly 14 is functioning in the first or second operating conditions. As such, the power steering controller 32 signals the main controller 38 which of the first and second operating conditions the primary steering assembly 14 is functioning in. For example, if the power steering controller 32 detects that the electric motor 56 did not actuate to assist the primary rack and pinion apparatus 50, and thus the steering wheel 16, the power steering controller 32 will signal to the main controller 38 that the primary steering assembly 14 is in the second operating condition. The electric motor 56 can be part of the primary steering of the vehicle 12, therefore, if the power steering controller 32 detects that there is the interruption with the function of the electric motor 56, the power steering controller 32 will signal to the main controller 38 that the back-up system is to steer the vehicle 12. It is to be appreciated that the primary steering of the vehicle 12 can include one or more of the electric motor 56, the primary rack and pinion apparatus 50, the steering gear mechanism 28, the intermediate shaft 24, and the steering column 20. Simply stated, the primary steering of the vehicle 12 generally includes the primary steering assembly 14.

Referring to FIG. 1, the steering system 10 can further include a contact sensor 68 coupled to the steering wheel 16 to detect contact on the steering wheel 16. Generally, the contact sensor 68 is in communication with the main controller 38. Under certain conditions, the contact sensor 68 communicates with the main controller 38 such that contact on the steering wheel 16 signals the main controller 38 to communicate to the secondary steering assembly 44 to switch from the second phase back to the first phase and communicate to the friction device 48 to switch from the engaged position back to the disengaged position. Simply stated, when the power steering controller 32 is in the second mode, once contact is detected on the steering wheel 16 by the driver, the steering wheel 16 is not secured in the initial position anymore and the driver can rotate the steering wheel 16 to steer the vehicle 12. It is to be appreciated that if the steering wheel 16 is being contacted but the contact sensor 68 does not signal the main controller 38 of this contact, the friction being applied to the primary steering assembly 14 by the friction device 48 can be overridden by the driver such that the driver can steer the vehicle 12. In other words, the friction being applied to the primary steering assembly 14 can secure the steering wheel 16 in the initial position while also allowing the driver to overcome this friction and turn the steering wheel 16 to steer the vehicle 12 if the friction device 48 remains in the engaged position after the steering wheel 16 has been touched. Furthermore, in general, if the friction device 48 does not switch from the engaged position to the disengaged position, again, the friction applied to the primary steering assembly 14 by the friction device 48 can be overridden by the driver such that the driver can turn the steering wheel 16 to steer the vehicle 12. In addition, in general, if the friction device 48 remains in the disengaged position instead of switching to the engaged position when the power steering controller 32 is in the second mode, the secondary steering assembly 44 will still switch to the second phase and steer the vehicle 12; and in this situation, the secondary steering assembly 44 will compensate for the front wheels wanting to self-align.

Continuing with FIG. 1, the steering system 10 can further include a steering wheel controller 70 in communication with the contact sensor 68 and the main controller 38. Therefore, in certain embodiments, when the power steering controller 32 is in the second mode and when contact is detected on the steering wheel 16, the contact sensor 68 communicates to the steering wheel controller 70 of the contact and the steering wheel controller 70 communicates to the main controller 38 that contact has been detected by the contact sensor 68. Therefore, the contact sensor 68 and the main controller 38 can be in direct communication with each other as indicated by the dashed line therebetween in FIG. 1 or the contact sensor 68 and the main controller 38 can be in communication with each other through the steering wheel controller 70 as indicated by the solid line going from the contact sensor 68 to the steering wheel controller 70 and the main controller 38 in FIG. 1.

The steering wheel controller 70, shown schematically in FIG. 1, can be embodied as a digital computer device or multiple such devices in communication with the various components of the vehicle 12. Structurally, the steering wheel controller 70 can include at least one microprocessor 72 along with sufficient tangible, non-transitory memory 74, e.g., read-only memory (ROM), flash memory, optical memory, additional magnetic memory, etc. The steering wheel controller 70 can also include any required random access memory (RAM), electrically-programmable read only memory (EPROM), a high-speed clock, analog-to-digital (A/D) and/or digital-to-analog (D/A) circuitry, and any input/output circuitry or devices, as well as any appropriate signal conditioning and buffer circuitry. Instructions for executing the methods 1000, 2000 for steering the vehicle 12 are recorded in the memory 74 and executed as needed via the microprocessor(s) 72. Optionally, the steering wheel controller 70 can be disposed in a steering wheel module and other components, such as sensors, etc., or components not specifically discussed herein, can be disposed in the steering wheel module.

In addition, the steering system 10 can include a brake system 76 in communication with the main controller 38. More specifically, the brake system 76 can include a brake controller 78 in communication with the main controller 38. The brake system 76 can further include a brake device 80 in communication with the main controller 38. More specifically, the brake controller 78 can be in communication with the main controller 38 and the brake device 80. Said differently, the brake device 80 can be in communication with the main controller 38 through the brake controller 78.

The brake controller 78, shown schematically in FIG. 1, can be embodied as a digital computer device or multiple such devices in communication with the various components of the vehicle 12. Structurally, the brake controller 78 can include at least one microprocessor 82 along with sufficient tangible, non-transitory memory 84, e.g., read-only memory (ROM), flash memory, optical memory, additional magnetic memory, etc. The brake controller 78 can also include any required random access memory (RAM), electrically-programmable read only memory (EPROM), a high-speed clock, analog-to-digital (A/D) and/or digital-to-analog (D/A) circuitry, and any input/output circuitry or devices, as well as any appropriate signal conditioning and buffer circuitry. Instructions for executing the methods 1000, 2000 for steering the vehicle 12 are recorded in the memory 84 and executed as needed via the microprocessor(s) 82. It is to be appreciated that the actuator 46 can be in communication with the main controller 38 through the rear steering controller 45 and another module or controller, such as, for example, the brake module or the brake controller 78 as represented by the dashed line from the rear steering controller 45 to the brake controller 78. Therefore, for example, the main controller 38 can communicate to the brake controller 78 to provide instructions to the actuator 46.

Generally, the brake device 80 is operable in a first brake phase to brake the vehicle 12 when the power steering controller 32 is in the first mode. For example, the brake device 80 operates in the first brake phase to stop movement of the vehicle 12, slow the vehicle 12 down and prevent movement of the vehicle 12 when the primary steering assembly 14 is functioning in the first operating condition such that the vehicle 12 is being steered without the steering wheel 16 being engaged by the driver. Therefore, when the brake device 80 is operating in the first brake phase, the primary steering assembly 14 is steering the vehicle 12 without the driver touching the steering wheel 16.

Optionally, the brake device 80 can be operable in a second brake phase to assist in steering the vehicle 12 when the power steering controller 32 is in the second mode. Furthermore, for example, the brake device 80 can operate in the second brake phase to assist in steering the vehicle 12 or guide the vehicle 12 along the road when the primary steering assembly 14 is functioning in the second operating condition such that the vehicle 12 is to be steered by the driver. Specifically, the brake device 80 can stabilize movement of the vehicle 12 or make adjustments to the movement of the vehicle 12 when the secondary steering assembly 44 is steering the vehicle 12 in the second phase. Simply stated, the secondary steering assembly 44 and the brake device 80 can cooperate to steer the vehicle 12 when the primary steering assembly 14 of the vehicle 12 has been interrupted. The main controller 38 is in communication with the brake controller 78 to signal to the brake controller 78 which of the brake phases the brake device 80 is to be operating in. Therefore, the brake controller 78, in response to the main controller 38, signals the brake device 80 to operate in one of the first and second brake phases.

Turning to FIG. 1, the brake device 80 can include a first brake 86 operatively coupled to the first wheel 52 and a second brake 88 operatively coupled to the second wheel 54. Furthermore, the brake device 80 can also include a third brake 90 operatively coupled to the third wheel 60 and a fourth brake 92 operatively coupled to the fourth wheel 62. It is to be appreciated that any suitable number of wheels 52, 54, 60, 62 can be utilized for the vehicle 12 having the primary and secondary steering assemblies 14, 44. For example, the first and second wheels 52, 54 can be the front wheels of a 3 or 4-wheeled vehicle 12, with the primary steering assembly 14 operatively coupled to the front wheels. As another example, the first wheel 52 can be the front wheel, with the primary steering assembly 14 operatively coupled to the front wheel and the second wheel 54 can be the rear wheel of a 2 or 3-wheeled vehicle 12, with the secondary steering assembly 44 operatively coupled to the rear wheel(s). As yet another example, the third and fourth wheels 60, 62 can be the rear wheels of a 3 or 4-wheeled vehicle 12, with the secondary steering assembly 44 operatively coupled to the rear wheels.

Furthermore, the brake system 76 can include a first sensor 94 in communication with the brake controller 78 and the first brake 86 of the first wheel 52 for selectively actuating the first brake 86 when the brake device 80 is in the second brake phase and the secondary steering assembly 44 is steering the vehicle 12 in the second phase. In addition, the brake system 76 can include a second sensor 96 in communication with the brake controller 78 and the second brake 88 of the second wheel 54 for selectively actuating the second brake 88 when the brake device 80 is in the second brake phase and the secondary steering assembly 44 is steering the vehicle 12 in the second phase. Therefore, the first and second sensors 94, 96 are each in communication with the brake controller 78 such that the brake controller 78 signals to the first and/or second sensors 94, 96 which of the first and/or second brakes 86, 88 are to be actuated. As such, when the brake device 80 is in the second brake phase, the primary steering assembly 14 is functioning in the second operating condition such that the vehicle 12 is being steered by the secondary steering assembly 44 in the second phase until the driver engages the steering wheel 16 as discussed below. Therefore, optionally, one or both of the first and second sensors 94, 96 can communicate to the first and second brakes 86, 88 to selectively actuate to assist the secondary steering assembly 44 in the second phase in steering the vehicle 12 along the road until the driver engages the steering wheel 16. It is to be appreciated that the first and second sensors 94, 96 can also function as anti-lock brake sensors to slow the vehicle 12 when, for example, sliding on ice, etc.

Additionally, the brake system 76 can include a third sensor 98 in communication with the brake controller 78 and the third brake 90 of the third wheel 60 for selectively actuating the third brake 90 when the brake device 80 is in the second brake phase and the secondary steering assembly 44 is steering the vehicle 12 in the second phase. The brake system 76 can further include a fourth sensor 100 in communication with the brake controller 78 and the fourth brake 92 of the fourth wheel 62 for selectively actuating the fourth brake 92 when the brake device 80 is in the second brake phase and the secondary steering assembly 44 is steering the vehicle 12 in the second phase. Therefore, the third and fourth sensors 98, 100 are each in communication with the brake controller 78 such that the brake controller 78 signals to the third and/or fourth sensors 98, 100 which of the third and/or fourth brakes 90, 92 are to be actuated. As such, when the brake device 80 is in the second brake phase, the primary steering assembly 14 is functioning in the second operating condition such that the vehicle 12 is being steered by the secondary steering assembly 44 in the second phase until the driver engages the steering wheel 16 as mentioned above. Therefore, optionally, one or both of the third and fourth sensors 98, 100 can communicate to the third and fourth brakes 90, 92 to selectively actuate to assist the secondary steering assembly 44 in the second phase in steering the vehicle 12 along the road until the driver engages the steering wheel 16. It is to be appreciated that the third and fourth sensors 98, 100 can also function as anti-lock brake sensors to slow the vehicle 12 when, for example, sliding on ice, etc. Optionally, the brake controller 78 and/or the first, second, third and fourth sensors 94, 96, 98, 100 can be disposed in a brake module. It is to also be appreciated that other braking components, such as sensors, etc., or components not specifically discussed herein, can be disposed in the brake module.

The brake controller 78 can signal at least one of the first, second, third and fourth sensors 94, 96, 98, 100 to actuate respective first, second, third and fourth brakes 86, 88, 90, 92 when the brake device 80 is in the second brake phase to assist the secondary steering assembly 44 in steering the vehicle 12 when in the second phase. In other words, when the first sensor 94 is signaled, the first brake 86 is actuated and when the second sensor 96 is signaled, the second brake 88 is actuated, and so on. When the friction device 48 is in the engaged position such that the steering wheel 16 is secured in the initial position, and when one or more of the first, second, third and fourth brakes 86, 88, 90, 92 are actuated, one or more yaw moments are created or generated to assist in steering the vehicle 12 when in the second brake phase. In other words, one or more brake torque yaw moments can be generated by the brake system 76 to assist in steering the vehicle 12 when the brake device 80 is in the second brake phase. Maintaining the steering wheel 16 in the initial position when the brake device 80 is in the second brake phase prevents or minimizes the steering wheel 16 from rotating due to torques urging the steering wheel 16 to self-align. Rotation of the steering wheel 16 can counteract the yaw movement created by the brakes 86, 88, 90, 92 when the brake device 80 is in the second brake phase by allowing the front wheels to self-align; therefore, the steering wheel 16 is secured in the initial position to minimize such counteraction. As such, when the steering wheel 16 is secured in the initial position, this simulates the driver holding or grasping the steering wheel 16. Thus, securing the steering wheel 16 in the initial position allows the brake device 80 to assist in steering the vehicle 12 with minimal influence by the steering wheel 16.

Referring to FIG. 3, the present disclosure also provides the method 1000 of steering the autonomously driven vehicle 12, as briefly mentioned above. The method 1000 includes determining 1002 that the power steering controller 32 is in one of the first mode and the second mode different from the first mode. As discussed above, the first mode can be when the primary steering assembly 14 is functioning in the first operating condition and the second mode can be when the primary steering assembly 14 is functioning in the second operating condition. As also discussed above, for example, the first operating condition occurs when the vehicle 12 is being operated without the steering wheel 16 being engaged by the driver and the second operating condition occurs when the vehicle 12 is to be steered by the driver.

The method 1000 also includes signaling 1004 the main controller 38 that the power steering controller 32 is in the first mode and signaling 1006 the main controller 38 that the power steering controller 32 is in the second mode. Therefore, the main controller 38 and the power steering controller 32 are in continuous communication with each other such that the main controller 38 continuously receives signals from the power steering controller 32 to indicate which of the modes the power steering controller 32 is in. Depending on which of the modes the power steering controller 32 is in, will determine whether the vehicle 12 is being operated in the first operating condition or the second operating condition.

When the power steering controller 32 is in the first mode and the primary steering assembly 14 is functioning in the first operating condition, in this condition, the method 1000 further includes signaling 1008 the secondary steering assembly 44, via the main controller 38, to operate in the first phase in response to the power steering controller 32 being in the first mode such that the primary steering assembly 14 steers the vehicle 12. In other words, when the power steering controller 32 is in the first mode, the secondary steering assembly 44 in the first phase can optionally be actuated to assist the primary steering assembly 14 in steering the vehicle 12. More specifically, signaling 1008 the secondary steering assembly 44, via the main controller 38, to operate in the first phase in response to the power steering controller 32 being in the first mode can include signaling the secondary steering assembly 44, via the rear steering controller 45 in communication with the main controller 38, to operate in the first phase in response to the power steering controller 32 being in the first mode such that the primary steering assembly 14 steers the vehicle 12. In the first operating condition, the primary steering assembly 14 primarily steers the vehicle 12 and can optionally be assisted by the secondary steering assembly 44 in the first phase to steer the vehicle 12.

Furthermore, the method 1000 includes signaling 1010 the friction device 48, via the main controller 38, to operate in the disengaged position in response to the power steering controller 32 being in the first mode such that the steering wheel 16 of the primary steering assembly 14 is rotatable. In other words, when the power steering controller 32 is in the first mode, the friction device 48 does not engage the primary steering assembly 14 such that the primary steering assembly 14 steers the vehicle 12. Generally, the secondary steering assembly 44 and the friction device 48 are each continuously in communication with the main controller 38 such that the main controller 38 continuously signals which phase the secondary steering assembly 44 is to be operating in and which position the friction device 48 is to be operating in. The secondary steering assembly 44 can be deactivated or activated when in the first phase and when the power steering controller 32 remains in the first mode. Furthermore, the friction device 48 remains in the disengaged position when the power steering controller 32 remains in the first mode.

When the secondary steering assembly 44 is in the first phase and the friction device 48 is in the disengaged position, the steering wheel 16 is rotatable. Simply stated, when the friction device 48 is in the disengaged position, the steering wheel 16 can rotate about the longitudinal axis 18 freely or unrestricted. As such, when the power steering controller 32 is in the first mode, the primary steering assembly 14 is operating in the first operating condition such that the vehicle 12 is being steered without the steering wheel 16 being engaged by the driver, with the secondary steering assembly 44 optionally assisting the primary steering assembly 14 when in the first phase. Therefore, for example, when the electric motor 56 is assisting in moving the primary rack and pinion apparatus 50, and thus, assisting in rotating the steering wheel 16, the power steering controller 32 will remain in the first mode and the vehicle 12 will continue to its destination without being manually steered by the driver.

When the main controller 38 has been signaled that the power steering controller 32 is in the second mode and the primary steering assembly 14 is functioning in the second operating condition, in this condition, the power steering controller 32 has switched from the first mode to the second mode. For example, the power steering controller 32 can switch from the first mode to the second mode when the electric motor 56 does not actuate to move the primary rack and pinion apparatus 50. In other words, the second mode can occur when there is the interruption in the power steering of the vehicle 12, such as an interruption in the primary steering assembly 14. Hence, when the power steering controller 32 is in the second mode, the driver is to manually steer the vehicle 12 as discussed below. Generally, the first mode occurs before the second mode.

The method 1000 further includes signaling 1012 the secondary steering assembly 44, via the main controller 38, to switch from the first phase to operate in the second phase in response to the power steering controller 32 being in the second mode such that the secondary steering assembly 44 steers the vehicle 12. More specifically, signaling 1012 the secondary steering assembly 44, via the main controller 38, to switch from the first phase to operate in the second phase in response to the power steering controller 32 being in the second mode can include signaling the secondary steering assembly 44, via the rear steering controller 45 in communication with the main controller 38, to switch from the first phase to operate in the second phase in response to the power steering controller 32 being in the second mode such that the secondary steering assembly 44 steers the vehicle 12. Even more specifically, signaling the secondary steering assembly 44, via the rear steering controller 45, to switch from the first phase to operate in the second phase in response to the power steering controller 32 being in the second mode can include signaling the actuator 46, via the rear steering controller 45, to move the secondary rack and pinion apparatus 58 in response to the secondary steering assembly 44 being in the second phase and the power steering controller 32 being in the second mode. Therefore, as discussed above, the secondary steering assembly 44 is in continuous communication with the main controller 38 such that the main controller 38 continuously signals whether the secondary steering assembly 44 is to be operating in the first phase or the second phase. Therefore, the method 1000 can further include actuating 1014 the actuator 46 to move the secondary rack and pinion apparatus 58 to pivot the third and fourth wheels 60, 62 when the secondary steering assembly 44 is in one of the first and second phases. More specifically, actuating 1014 the actuator 46 to move the secondary rack and pinion apparatus 58 to pivot the third and fourth wheels 60, 62 can include actuating the actuator 46 to move the secondary rack and pinion apparatus 58 to pivot the third and fourth wheels 60, 62 when the secondary steering assembly 44 is in the first phase to assist the primary steering assembly 14 in steering the vehicle without the steering wheel 16 being engaged by the driver. Furthermore, actuating 1014 the actuator 46 to move the secondary rack and pinion apparatus 58 to pivot the third and fourth wheels 60, 62 can include actuating the actuator 46 to move the secondary rack and pinion apparatus 58 to pivot the third and fourth wheels 60, 62 when the secondary steering assembly 44 is in the second phase when the interruption occurs in the primary steering assembly 14 of the vehicle 12. Said differently, when the actuator 46 is signaled to the second phase, the actuator 46 actuates to move the secondary rack and pinion apparatus 58 as directed by the main controller 38.

The method 1000 also includes actuating 1016 the friction device 48 from the disengaged position to the engaged position in response to the power steering controller 32 being in the second mode. More specifically, actuating 1016 the friction device 48 from the disengaged position to the engaged position in response to the power steering controller 32 being in the second mode can include signaling the friction device 48, via the main controller 38, to actuate from the disengaged position to the engaged position in response to the power steering controller 32 being in the second mode. As discussed above, the friction device 48 is in continuous communication with the main controller 38 such that the main controller 38 continuously signals which position the friction device 48 is to be operating in. Generally, in certain embodiments, signaling 1012 the secondary steering assembly 44, via the main controller 38, to switch from the first phase to operate in the second phase in response to the power steering controller 32 being in the second mode and signaling the friction device 48, via the main controller 38, to actuate from the disengaged position to the engaged position in response to the power steering controller 32 being in the second mode occurs simultaneously through communication with the main controller 38. More specifically, signaling the actuator 46, via the rear steering controller 45, to move the secondary rack and pinion apparatus 58 in response to the secondary steering assembly 44 being in the second phase and the power steering controller 32 being in the second mode and signaling the friction device 48, via the main controller 38, to actuate from the disengaged position to the engaged position in response to the power steering controller 32 being in the second mode occurs simultaneously through communication with the main controller 38.

Furthermore, the method 1000 includes engaging 1018 the primary steering assembly 14 with the friction device 48 when the friction device 48 is in the engaged position to secure the steering wheel 16 in the initial position such that the secondary steering assembly 44 steers the vehicle 12 when in the second phase. As such, in one embodiment, engaging 1018 the primary steering assembly 14 with the friction device 48 can include engaging the steering column 20 with the friction device 48 when the friction device 48 is in the engaged position to secure the steering wheel 16 in the initial position. In another embodiment, engaging 1018 the primary steering assembly 14 with the friction device 48 can include engaging the intermediate shaft 24 with the friction device 48 when the friction device 48 is in the engaged position to secure the steering wheel 16 in the initial position. In yet another embodiment, engaging 1018 the primary steering assembly 14 with the friction device 48 can include engaging the steering gear mechanism 28 with the friction device 48 when the friction device 48 is in the engaged position to secure the steering wheel 16 in the initial position.

As discussed above, when the friction device 48 is in the engaged position such that the steering wheel 16 is secured in the initial position, the secondary steering assembly 44 can steer the vehicle 12. Therefore, when the actuator 46 is activated or actuated, the actuator 46 causes movement of the secondary rack and pinion apparatus 58 back and forth to steer the vehicle 12. Maintaining the steering wheel 16 in the initial position when the secondary steering assembly 44 is operating in the second phase prevents or minimizes the steering wheel 16 from rotating due to torques urging the steering wheel 16 to self-align. Rotation of the steering wheel 16 can counteract the movement of the rear wheels when the secondary steering assembly 44 is operating in the second phase to steer the vehicle 12 by allowing the front wheels to self-align; therefore, the steering wheel 16 is secured in the initial position to minimize such counteraction. As such, when the steering wheel 16 is secured in the initial position, this simulates the driver holding the steering wheel 16 to allow the secondary steering assembly 44 to steer the vehicle 12 in the second phase until the driver actually contacts or touches the steering wheel 16 as discussed below. Thus, the first and second wheels 52, 54 (the front wheels) remain in a certain position as the third and fourth wheels 60, 62 (the rear wheels) pivot or turn to steer the vehicle 12 when the friction device 48 is in the engaged position and the secondary steering assembly 44 is in the second phase.

The method 1000 can further include coupling 1020 the contact sensor 68 to the steering wheel 16, with the contact sensor 68 in communication with the main controller 38. In addition, the method 1000 can include detecting 1022 contact on the steering wheel 16, via the contact sensor 68, when the power steering controller 32 is in the second mode. The method 1000 can also include signaling 1024 the main controller 38, via the contact sensor 68, that contact is detected on the steering wheel 16 when the power steering controller 32 is in the second mode. For example, when the driver contacts, engages or touches the steering wheel 16 when the power steering controller 32 is in the second mode, the contact sensor 68 detects this contact or touching on the steering wheel 16 and signals the main controller 38 that the steering wheel 16 is being contacted or touched. It is to be appreciated that the main controller 38 can be signaled through the steering wheel controller 70 whether the contact sensor 68 detects contact on the steering wheel 16. Therefore, signaling 1024 the main controller 38, via the contact sensor 68, that contact is detected can include signaling the main controller 38, via the steering wheel controller 70, that contact is detected on the steering wheel 16 by the contact sensor 68. Until contact is detected on the steering wheel 16 and communicated to the main controller 38, the secondary steering assembly 44 will continue to be operating in the second phase to steer the vehicle 12 and the friction device 48 will continue to operate in the engaged position.

When contact is detected by the contact sensor 68 and the driver has taken over manually steering the vehicle 12 while the power steering controller 32 remains in the second mode, in this condition, the method 1000 can include signaling 1026 the secondary steering assembly 44, via the main controller 38, to switch from the second phase back to operation in the first phase in response to contact on the steering wheel 16 when the power steering controller 32 is in the second mode. More specifically, signaling 1026 the secondary steering assembly 44, via the main controller 38, to switch from the second phase back to operation in the first phase in response to contact on the steering wheel 16 can include signaling the secondary steering assembly 44, via the rear steering controller 45 in communication with the main controller 38, to switch from the second phase back to operation in the first phase in response to contact on the steering wheel 16 when the power steering controller 32 is in the second mode. Even more specifically, signaling the secondary steering assembly 44, via the rear steering controller 45, to switch from the second phase back to operation in the first phase in response to contact on the steering wheel 16 can include signaling the actuator 46, via the rear steering controller 45, to switch operation from the second phase back to the first phase in response to contact on the steering wheel 16 when the power steering controller 32 is in the second mode. Therefore, when the secondary steering assembly 44 switches back to being in the first phase, the secondary steering assembly 44 is no longer primarily steering the vehicle 12. As such, for example, when the secondary steering assembly 44 is switched back to the first phase, the rear wheels can optionally assist in steering the vehicle 12.

Furthermore, the method 1000 can include actuating 1028 the friction device 48 from the engaged position back to the disengaged position in response to contact on the steering wheel 16 when the power steering controller 32 is in the second mode. More specifically, actuating 1028 the friction device 48 from the engaged position back to the disengaged position in response to contact on the steering wheel 16 can include signaling the friction device 48, via the main controller 38, to actuate from the engaged position back to the disengaged position in response to contact on the steering wheel 16 when the power steering controller 32 is in the second mode. Generally, in certain embodiments, signaling the secondary steering assembly 44, via the rear steering controller 45, to switch from the second phase back to operation in the first phase in response to contact on the steering wheel 16 and signaling the friction device 48, via the main controller 38, to actuate from the engaged position back to the disengaged position in response to contact on the steering wheel 16 occurs simultaneously through communication with the main controller 38. More specifically, signaling the actuator 46, via the rear steering controller 45, to switch operation from the second phase back to the first phase in response to contact on the steering wheel 16 and signaling the friction device 48, via the main controller 38, to actuate from the engaged position back to the disengaged position in response to contact on the steering wheel 16 occurs simultaneously through communication with the main controller 38. Therefore, when the friction device 48 returns to the disengaged position, the driver can rotate the steering wheel 16 to manually steer the vehicle 12 and when the secondary steering assembly 44 returns to operation in the first phase, optionally, the third and fourth wheels 60, 62 can be pivoted to assist in steering the vehicle 12.

The method 1000 can further include disengaging 1030 the primary steering assembly 14 with the friction device 48 when the friction device 48 is in the disengaged position to allow rotation of the steering wheel 16 when the secondary steering assembly 44 is back being operated in the first phase. As such, in one embodiment, disengaging 1030 the primary steering assembly 14 with the friction device 48 can include disengaging the steering column 20 with the friction device 48 when the friction device 48 is in the disengaged position to allow rotation of the steering wheel 16 when the secondary steering assembly 44 is back being operated in the first phase. In another embodiment, disengaging 1030 the primary steering assembly 14 with the friction device 48 can include disengaging the intermediate shaft 24 with the friction device 48 when the friction device 48 is in the disengaged position to allow rotation of the steering wheel 16 when the secondary steering assembly 44 is back being operated in the first phase. In yet another embodiment, disengaging 1030 the primary steering assembly 14 with the friction device 48 can include disengaging the steering gear mechanism 28 with the friction device 48 when the friction device 48 is in the disengaged position to allow rotation of the steering wheel 16 when the secondary steering assembly 44 is back being operated in the first phase. Therefore, as discussed above, when the friction device 48 is in the disengaged position, the driver can rotate the steering wheel 16 to manually steer the vehicle 12 while the power steering controller 32 remains in the second mode. As such, the first and second wheels 52, 54 pivot when the driver manually steers the vehicle 12 with the steering wheel 16 while the third and fourth wheels 60, 62 optionally can assist in steering the vehicle 12 when the second steering assembly is back being operated in the first phase.

Optionally, the method 1000 can further include signaling 1032 the brake device 80, via the main controller 38, to operate in the first brake phase in response to the power steering controller 32 being in the first mode. Therefore, generally, the brake device 80 is continuously in communication with the main controller 38 such that the main controller 38 continuously signals which brake phase the brake device 80 is to be operating in. The brake device 80 remains in the first brake phase when the power steering controller 32 remains in the first mode. Therefore, the brake device 80 functions to slow down or stop the vehicle 12 when the primary steering assembly 14 operates to steer the vehicle 12, and thus, the brake device 80 is in the first brake phase and the power steering controller 32 is in the first mode. As such, the vehicle 12 will continue to its destination without being manually steered by the driver when the power steering controller 32 is in the first mode.

The method 1000 can optionally further include signaling 1034 the brake device 80, via the main controller 38, to switch from the first brake phase to selectively operate in the second brake phase in response to the power steering controller 32 being in the second mode such that the brake device 80 assists the secondary steering assembly 44 in steering the vehicle 12 when in the second phase. More specifically, signaling 1034 the brake device 80, via the main controller 38, to switch from the first brake phase to selectively operate in the second brake phase in response to the power steering controller 32 being in the second mode can include signaling the brake controller 78, via the main controller 38, to activate the brake device 80 to operate in the second brake phase in response to the power steering controller 32 being in the second mode. Therefore, as discussed above, the brake device 80 is in continuous communication with the main controller 38 such that the main controller 38 continuously signals which brake phase the brake device 80 is to be operating in. It is to be appreciated that the brake device 80 can operate in the first brake phase when the power steering controller 32 is in the second mode.

Furthermore, the method 1000 can include actuating 1036 one or more of the first, second, third and fourth brakes 86, 88, 90, 92 in response to the brake device 80 being in the second brake phase to assist the secondary steering assembly 44 in steering the vehicle 12 in the second phase. Therefore, actuating 1036 one or more of the first, second third and fourth brakes 86, 88, 90, 92 in response to the brake device 80 being in the second brake phase can include actuating one or more of the first, second, third and fourth brakes 86, 88, 90, 92 to generate at least one yaw moment to assist the secondary steering assembly 44 in steering the vehicle 12 in the second phase when the interruption occurs in the primary steering of the vehicle 12. When contact is detected on the steering wheel 16, the brake device 80 switches back to the first brake phase such that the brake device 80 is no longer assisting in steering the vehicle 12. As such, for example, when the brake device 80 is in the first brake phase, the brakes 86, 88, 90, 92 can slow or stop the vehicle 12. It is to be appreciated that signaling 1034 the brake device 80 and actuating 1036 one or more of the first, second, third and fourth brakes 86, 88, 90, 92 both can occur before signaling 1024 the main controller 38, via the contact sensor 68, that contact is detected on the steering wheel 16 when the power steering controller 32 is in the second mode.

The present disclosure further provides another method 2000 of steering the autonomously driven vehicle 12, as briefly mentioned above. The method 2000 includes operating 2002 the secondary steering assembly 44 in a predetermined phase or the second phase to steer the vehicle 12 when the interruption occurs in the primary steering assembly 14 of the vehicle 12. More specifically, operating 2002 the secondary steering assembly 44 to steer the vehicle 12 can include actuating the actuator 46 to move the secondary rack and pinion apparatus 58 to pivot the third and fourth wheels 60, 62 (the rear wheels) of the vehicle 12 to steer the vehicle 12 when the interruption occurs in the primary steering assembly 14 of the vehicle 12. Simply stated, when the interruption occurs to the primary steering assembly 14, the secondary steering assembly 44 steers the vehicle 12.

The method 2000 also includes engaging 2004 the primary steering assembly 14 with the friction device 48 to secure the steering wheel 16 in the initial position when the secondary steering assembly 44 is in the second phase to steer the vehicle 12. Therefore, for example, the primary steering assembly 14 pivots the first and second wheels 52, 54, or the front wheels, and furthermore, the secondary steering assembly 44 pivots the third and fourth wheels 60, 62, or the rear wheels. More specifically, engaging 2004 the primary steering assembly 14 with the friction device 48 to secure the steering wheel 16 in the initial position can include engaging one of the steering column 20, the intermediate shaft 24 and the steering gear mechanism 28 with the friction device 48 to secure the steering wheel 16 in the initial position when operating the secondary steering assembly 44 in the second phase to steer the vehicle 12. Therefore, in one embodiment, engaging 2004 the primary steering assembly 14 with the friction device 48 can include engaging the steering column 20 with the friction device 48 to secure the steering wheel 16 in the initial position. In another embodiment, engaging 2004 the primary steering assembly 14 with the friction device 48 can include engaging the intermediate shaft 24 with the friction device 48 to secure the steering wheel 16 in the initial position. In yet another embodiment, engaging 2004 the primary steering assembly 14 with the friction device 48 can include engaging the steering gear mechanism 28 with the friction device 48 to secure the steering wheel 16 in the initial position.

It is to be appreciated that the order or sequence of performing the methods 1000, 2000 as identified in the flowcharts of FIGS. 3 and 4 are for illustrative purposes and other orders or sequences are within the scope of the present disclosure. For example, coupling 1020 the contact sensor 68 to the steering wheel 16 can occur before determining 1002 that the power steering controller 32 is in one of the first mode and the second mode different from the first mode. It is to also be appreciated that the methods 1000, 2000 can include other features not specifically identified in the flowcharts of FIGS. 3 and 4. In addition, the method 2000 can include features of the method 1000, such as for example, determining that the power steering controller 32 is in one of the first mode and the second mode, the main controller 38 can signal and be signaled, the secondary steering assembly 44 can signal and be signaled, the friction device 48 can be signaled and actuated, the contact sensor 68 can be coupled to the steering wheel 16 and detect/signal, the primary steering assembly 14 can be disengaged, the brake device 80 and the brake controller 78 can each signal and be signaled, etc.

While the best modes for carrying out the disclosure have been described in detail, those familiar with the art to which this disclosure relates will recognize various alternative designs and embodiments for practicing the disclosure within the scope of the appended claims.

The invention claimed is:

1. A steering system for an autonomously driven vehicle, the system comprising:

- a primary steering assembly including a rotatable steering wheel;
- a power steering controller in communication with the primary steering assembly and having a first mode and a second mode;
- a main controller in communication with the power steering controller;
- a secondary steering assembly in communication with the main controller such that the main controller signals the secondary steering assembly to operate in a first phase when the power steering controller is in the first mode and a second phase to steer the vehicle when the power steering controller is in the second mode; and
- a friction device coupled to the primary steering assembly and movable between a disengaged position releasing the primary steering assembly to allow rotation of the steering wheel and an engaged position engaging the primary steering assembly to secure the steering wheel in an initial position, wherein the main controller is in communication with the friction device to signal the friction device to actuate to the disengaged position when the power steering controller is in the first mode and the secondary steering assembly is in the first phase, and to signal the friction device to actuate to the engaged position to secure the steering wheel in the initial position when the power steering controller is in the second mode and the secondary steering assembly is in the second phase to allow the secondary steering assembly to steer the vehicle.

2. A system as set forth in claim 1 wherein the primary steering assembly includes a rotatable steering column, with the steering wheel attached to the steering column such that the steering wheel and the steering column commonly rotate.

3. A system as set forth in claim 2 wherein the friction device is coupled to the steering column such that the friction device engages the steering column when in the engaged position to secure the steering wheel in the initial position.

4. A system as set forth in claim 2 wherein the primary steering assembly includes an intermediate shaft operatively coupled to the steering column such that the intermediate shaft and the steering column commonly rotate.

5. A system as set forth in claim 4 wherein the friction device is coupled to the intermediate shaft such that the friction device engages the intermediate shaft when in the engaged position to secure the steering wheel in the initial position.

6. A system as set forth in claim 4 wherein the primary steering assembly includes a steering gear mechanism operatively coupled to the intermediate shaft, with the intermediate shaft disposed between the steering gear mechanism and the steering column.

7. A system as set forth in claim 6 wherein the friction device is coupled to the steering gear mechanism such that the friction device engages the steering gear mechanism when in the engaged position to secure the steering wheel in the initial position.

8. A system as set forth in claim 6 wherein the primary steering assembly includes a primary rack and pinion apparatus operatively coupled to the steering gear mechanism and extending outwardly to distal ends opposing each other, with a first wheel and a second wheel operatively coupled to respective distal ends of the primary rack and pinion apparatus, and wherein the steering gear mechanism includes an electric motor to assist in moving the primary rack and pinion apparatus in response to rotation of the steering wheel to pivot the first and second wheels and steer the vehicle when the power steering controller is in the first mode, with the power steering controller in communication with the electric motor.

9. A system as set forth in claim 1 wherein the secondary steering assembly is in communication with the main controller through a rear steering controller, and wherein the secondary steering assembly includes an actuator in communication with the rear steering controller such that the rear steering controller signals the actuator to operate in the first phase when the power steering controller is in the first mode and operate in the second phase when the power steering controller is in the second mode.

10. A system as set forth in claim 9 wherein the secondary steering assembly includes a secondary rack and pinion apparatus extending outwardly to distal ends opposing each other, with a third wheel and a fourth wheel operatively coupled to respective distal ends of the secondary rack and pinion apparatus, and with the actuator operatively coupled to the secondary rack and pinion apparatus such that actuation of the actuator moves the secondary rack and pinion apparatus to pivot the third and fourth wheels to steer the vehicle when the secondary steering assembly is in the second phase and the power steering controller is in the second mode.

11. A system as set forth in claim 10 wherein the primary steering assembly includes a rotatable steering column, with the steering wheel attached to the steering column such that the steering wheel and the steering column commonly rotate, and wherein the primary steering assembly includes an intermediate shaft operatively coupled to the steering column such that the intermediate shaft and the steering column commonly rotate, and wherein the primary steering assembly includes a steering gear mechanism operatively coupled to the intermediate shaft, with the intermediate shaft disposed between the steering gear mechanism and the steering column.

12. A system as set forth in claim 11 wherein the primary steering assembly includes a primary rack and pinion apparatus operatively coupled to the steering gear mechanism and extending outwardly to distal ends opposing each other, with a first wheel and a second wheel operatively coupled to respective distal ends of the primary rack and pinion apparatus, and wherein the first and second wheels are disposed adjacent to a front of the vehicle and the third and fourth wheels are disposed adjacent to a rear of the vehicle.

13. A system as set forth in claim 1 further including a contact sensor coupled to the steering wheel to detect contact on the steering wheel, with the contact sensor in communication with the main controller such that contact on the steering wheel signals the main controller to communicate to the secondary steering assembly to switch from the second phase back to the first phase and communicate to the friction device to switch from the engaged position back to the disengaged position.

14. A method of steering an autonomously driven vehicle, the method comprising:

determining that a power steering controller is in one of a first mode and a second mode different from the first mode;

signaling a main controller that the power steering controller is in the first mode;

signaling a secondary steering assembly, via the main controller, to operate in a first phase in response to the power steering controller being in the first mode such that a primary steering assembly steers the vehicle;

signaling a friction device, via the main controller, to operate in a disengaged position in response to the power steering controller being in the first mode such that a steering wheel of the primary steering assembly is rotatable;

signaling the main controller that the power steering controller is in the second mode; and signaling the secondary steering assembly, via the main controller, to switch from the first phase to operate in a second phase in response to the power steering controller being in the second mode such that the secondary steering assembly steers the vehicle;

actuating the friction device from the disengaged position to the engaged position in response to the power steering controller being in the second mode;

engaging the primary steering assembly with the friction device when the friction device is in the engaged position to secure the steering wheel in an initial position such that the secondary steering assembly steers the vehicle when in the second phase.

15. A method as set forth in claim 14 wherein:

signaling the secondary steering assembly, via the main controller, to operate in the first phase in response to the power steering controller being in the first mode includes signaling the secondary steering assembly, via a rear steering controller in communication with the main controller, to operate in the first phase in response to the power steering controller being in the first mode such that the primary steering assembly steers the vehicle;

signaling the secondary steering assembly, via the main controller, to switch from the first phase to operate in the second phase in response to the power steering controller being in the second mode includes signaling the secondary steering assembly, via the rear steering controller in communication with the main controller, to switch from the first phase to operate in the second phase in response to the power steering controller being in the second mode such that the secondary steering assembly steers the vehicle;

signaling the secondary steering assembly, via the rear steering controller, to switch from the first phase to operate in the second phase in response to the power steering controller being in the second mode includes signaling an actuator, via the rear steering controller, to move a secondary rack and pinion apparatus in response to the secondary steering assembly being in the second phase and the power steering controller being in the second mode; and actuating the friction device from the disengaged position to the engaged position in response to the power steering controller being in the second mode includes signaling the friction device, via the main controller, to actuate from the disengaged position to the engaged position in response to the power steering controller being in the second mode.

16. A method as set forth in claim 15 wherein signaling the actuator, via the rear steering controller, to move the secondary rack and pinion apparatus in response to the secondary steering assembly being in the second phase and the power steering controller being in the second mode and signaling the friction device, via the main controller, to actuate from the disengaged position to the engaged position in response to the power steering controller being in the second mode occurs simultaneously through communication with the main controller.

17. A method as set forth in claim 14 further comprising:

coupling a contact sensor to the steering wheel, with the contact sensor in communication with the main controller;

detecting contact on the steering wheel, via the contact sensor, when the power steering controller is in the second mode; and signaling the main controller, via the contact sensor, that contact is detected on the steering wheel when the power steering controller is in the second mode.

18. A method as set forth in claim 17 further comprising:

signaling the secondary steering assembly, via the main controller, to switch from the second phase back to operation in the first phase in response to contact on the steering wheel when the power steering controller is in the second mode; and actuating the friction device from the engaged position back to the disengaged position in response to contact on the steering wheel when the power steering controller is in the second mode.

19. A method as set forth in claim 18 wherein:

signaling the secondary steering assembly, via the main controller, to switch from the second phase back to operation in the first phase in response to contact on the steering wheel includes signaling the secondary steering assembly, via a rear steering controller in communication with the main controller, to switch from the second phase back to operation in the first phase in response to contact on the steering wheel when the power steering controller is in the second mode;

actuating the friction device from the engaged position back to the disengaged position in response to contact on the steering wheel includes signaling the friction device, via the main controller, to actuate from the engaged position back to the disengaged position in response to contact on the steering wheel when the power steering controller is in the second mode; and signaling the secondary steering assembly, via the rear steering controller, to switch from the second phase back to operation in the first phase in response to contact on the steering wheel and signaling the friction device, via the main controller, to actuate from the engaged position back to the disengaged position in response to contact on the steering wheel occurs simultaneously through communication with the main controller.

20. A method of steering an autonomously driven vehicle, the method comprising:

operating a secondary steering assembly in a predetermined phase to steer the vehicle when an interruption occurs in a primary steering assembly of the vehicle; and engaging the primary steering assembly with a friction device to secure a steering wheel in an initial position when the secondary steering assembly is in the predetermined phase to steer the vehicle without touching the steering wheel.

* * * * *